(12) United States Patent
Audenaert et al.

(10) Patent No.: US 6,833,182 B2
(45) Date of Patent: Dec. 21, 2004

(54) SIZE COMPOSITIONS, SIZED GLASS FIBERS AND THEIR USE

(75) Inventors: Raymond Audenaert, Hamme (BE); Detlev Joachimi, Krefeld (DE); Alexander Karbach, Krefeld (DE); Stephan Kirchmeyer, Leverkusen (DE); Joachim Simon, Düsseldorf (DE)

(73) Assignees: Bayer Aktiengesellschaft, Leverkusen (DE); Bayer Antwerpen N.V., Antwerp (BE)

( * ) Notice: Subject to any disclaimer, the term of this patent is extended or adjusted under 35 U.S.C. 154(b) by 0 days.

(21) Appl. No.: 09/455,597

(22) Filed: Dec. 6, 1999

(65) Prior Publication Data

US 2002/0031665 A1 Mar. 14, 2002

(30) Foreign Application Priority Data

Dec. 14, 1998 (DE) .......................................... 198 57 530

(51) Int. Cl.⁷ ............................................. B32B 27/12
(52) U.S. Cl. ............................... 428/297.4; 428/300.1; 428/372; 428/375; 428/378; 428/392; 252/8.83
(58) Field of Search ............................... 252/8.81, 8.83; 428/297.4, 300.1, 372, 375, 378, 392; 524/522, 47

(56) References Cited

U.S. PATENT DOCUMENTS

| | | | |
|---|---|---|---|
| 3,249,412 A | 5/1966 | Kolek et al. ........................ 65/3 |
| 3,449,281 A | 6/1969 | Sullivan et al. .............. 260/292 |
| 3,926,894 A | 12/1975 | de Paul Clark ...... 260/29.6 MP |
| 3,936,285 A | * 2/1976 | Maaghul ..................... 428/378 |
| 3,997,306 A | 12/1976 | Hedden ......................... 65/3 C |
| 4,038,243 A | 7/1977 | Maaghul ................... 260/40 R |
| 4,049,865 A | * 9/1977 | Maaghul ..................... 428/391 |
| 4,394,418 A | 7/1983 | Temple ........................ 428/391 |
| 4,487,797 A | 12/1984 | Watson ........................ 428/268 |
| 4,659,753 A | 4/1987 | Tiburtius et al. ............. 523/209 |
| 4,764,553 A | 8/1988 | Mosbach et al. ............ 524/591 |
| 5,247,004 A | * 9/1993 | Swisher et al. .............. 524/494 |
| 5,646,207 A | * 7/1997 | Schell ........................... 524/47 |
| 5,804,313 A | * 9/1998 | Schell ......................... 429/391 |
| 5,824,413 A | * 10/1998 | Schell ........................ 428/378 |
| 5,900,454 A | 5/1999 | Kirchmeyer et al. ........ 524/522 |

FOREIGN PATENT DOCUMENTS

| | | |
|---|---|---|
| EP | 27942 | 3/1983 |
| EP | 311894 | 11/1995 |
| JP | 9-208268 | 8/1997 |

OTHER PUBLICATIONS

Houben–Weyl, Methoden der Organische Chemie, vol. E20, ed. by H. Bactl and J. Falbe (month unavailable), 1987, pp. 1587 –1604, "Herstellung, Isocyanate als Ausgangsverbindungen".

Houben–Weyl, Methoden der Organische Chemie, vol. E20, ed. by H. Bactl and J. Falbe (month unavailable), 1987, pp. 1659 –1681, "Durch Isocyanat–Polyaddition im Zweiphasen–System (Dispersion in Wasser)".

Houben–Weyl, Methoden der Organische Chemie, vol. E20, ed. by H. Bactl and J. Falbe (month unavailable), 1987, pp. 1686 –1689, "D. Dieterich: Poly(urethane)".

* cited by examiner

*Primary Examiner*—Rena Dye
*Assistant Examiner*—J. M. Gray
(74) *Attorney, Agent, or Firm*—Godfried R. Akorli; Diderico van Eyl

(57) ABSTRACT

A composition suitable for sizing of glass fibers is disclosed. The composition contains water dispersible, water-soluble or water emulsifiable resin selected from the group consisting of polyepoxide, polyester, polyvinyl acetate, polyacrylate and polyurethane, water, an organofunctional silane, and a nucleating agent. Optional components include emulsifiers, lubricants, wetting and anti-static agents. Glass fibers sized with the composition are suitable for preparing composites having improved mechanical properties.

4 Claims, 1 Drawing Sheet

| Sizing without talc | Time of tempering after cooling from 250°C to 205°C | Sizing with talc |
|---|---|---|
|  Fig. 1a | Fig. 2a  3 minutes |  |
|  Fig. 1b | Fig. 2b  4 minutes | 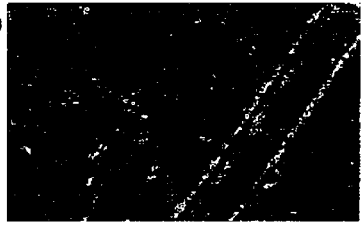 |
| 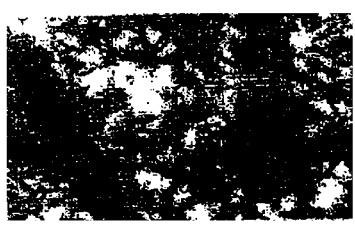 Fig. 1c | Fig. 2c  5 minutes | 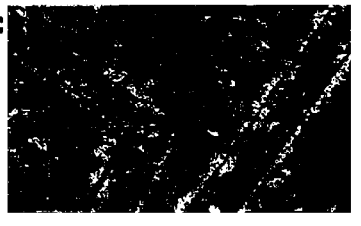 |
Isothermal crystallization of polyamide 6 in combination with resized glasfibers

SIZE COMPOSITIONS, SIZED GLASS FIBERS AND THEIR USE

The present invention relates to size compositions, sized glass fibers and their use.

The properties of composites of glass fibers and polymers are affected to a large extent by the shear strength between the glass fibers and the polymer matrix surrounding the glass fibers. The task of the size is to produce this composite structure between the glass fiber and the matrix polymer and at the same time to ensure the producibility and processability of the glass fibers. Compositions consisting of water, a polymeric binder (the so-called film-former), an adhesion promoter, lubricants, anti-static agents and other auxiliary substances are used as sizes. Organic, water-dispersible or water-soluble polyvinyl acetate, polyester-epoxide, polyurethane, polyacrylate or polyolefin resins or mixtures thereof are generally used as binders.

Film-formers and adhesion promoters are generally selected so that there is an affinity between the polymer matrix and the film-former and/or adhesion promoter and thus a mechanical composite is formed between the glass fibers and the polymer matrix. It is therefore understood that the formulations for sizes have to be optimised to the particular polymer matrix and that the properties of the composites respond in a sensitive manner to changes in the size composition.

In the case of partly crystalline thermoplasts, the crystallinity (ratio of crystalline to amorphous regions; crystal morphology) of the polymer in regions surrounding the glass fibers may also be affected by the size.

It is known that certain organic or inorganic substances can act as nucleating agents for partly crystalline thermoplasts, i.e. they act as a seed-producer for crystal growth in the partly crystalline polymers. The nucleating effect depends on the interaction (e.g. steric interactions, hydrogen bridge bonds) of the surface of the nucleating agent with the polymer chains. The polymer chains become ordered due to interactions on the surface, which means that crystal growth is initiated or encouraged. Seed-producers or nucleating agents are used in particular during the preparation of compounds where the acceleration of crystallisation and/or homogeneous seed-production is desired. Homogeneous seed-production normally leads to smaller crystallites with more uniform size distribution and can thus lead to an improvement in mechanical properties such as toughness and strength. The seed-producing effect of nucleating agents takes place, in composites which contain glass fibers, from the matrix. Under the production conditions for nucleated, glass fiber reinforced compounds, the nucleating agent is added as a solid or in the form of a concentrate during the compounding process and distributed uniformly in the matrix.

The object of the present invention is to provide polymer composites (composites of polymer and glass fibers) which have especially good mechanical properties such as, for example, toughness and strength.

This object can be achieved, surprisingly, by specific size compositions and with glass fibers which are sized with these specific size compositions. Size compositions according to the invention contain, in addition to water-dispersible or water-soluble polyepoxides, polyesters, polyvinyl acetates, polyacrylates and/or polyurethanes as film-former, organofunctional silanes as adhesion promoters and other conventional size constituents, organic or inorganic nucleating agents with particle sizes <300 nm which are practically insoluble in polymer melts, for example in polyamides, in polypropylenes and in polybutylene terephthalates.

DESCRIPTION OF THE FIGURES

FIGS. 1a, 1b, 1c, 2a, 2b, and 2c photographically depict the appearance of samples after specific cooling times under identical cooling conditions.

Practically insoluble means in this context that one per cent or less of the amount of the nucleating agents used is soluble.

The invention therefore provides size compositions for glass fibers, consisting of a) 2 to 20 wt. %, preferably 4 to 10 wt. %, of water-dispersible, water-emulsifiable or water-soluble polyepoxides, polyesters, polyvinyl acetates, polyacrylates and/or poly-urethanes as film-former, b) 0.1 to 10 wt. %, preferably 0.3 to 2 wt. %, of organofunctional alkoxysilanes as adhesion promoters, c) 0.1 to 20 wt. %, preferably 0.5 to 5 wt. %, of inorganic or organic nucleating agents being compounds which are chemically inert and thermally stable at the processing temperatures used at the introduction of the sized glass fibers into the polymer melt, having average particle sizes <300 nm and >10 nm, preferably <150 nm, in particular between 150 nm and 40 nm, and being practically insoluble in polymer melts, for example in polyamides, polypropylenes, and polybutylene terephthalates, d) 0 to 5 wt. %, preferably 0 to 1 wt. %, of other conventional auxiliary substances such as, for example, lubricants, emulsifiers, wetting agents, anti-static agents, etc., e) 0 to 5 wt. % of additives for adjusting the pH to between 4 and 10, this being the optimum for the particular size, (e.g. organic or inorganic acids or bases) and f) the remainder being water up to 100 wt. %.

Component (c) is preferably a nucleating agent such as, for example, talcum, barium sulfate, titanium dioxide, lithium salts, calcium phenylphosphinate, sodium phenylphosphinate, calcium fluoride, salts of organic acids, (for example derivatives of benzoic acid and terephthalic acid), sorbitol, sorbitol derivatives, tannin, tannin derivatives, etc.

The invention also provides sized glass fibers which are sized with the size composition according to the invention.

The invention also provides polymer composites which contain glass fibers sized with the size compositions according to the invention.

Sized glass fibers according to the invention are preferably used for reinforcing thermoplastic and thermoset polymers, in particular thermoplastic polyamides polypropylene and aromatic polyesters.

The nucleating effect of sizes according to the invention or the glass fibers sized therewith in the composite is all the more surprising since it has not hitherto been possible to fix nucleating agents onto glass fibers in such a way that no separation from the glass fibers occurs (due to mechanical loosening caused by shear forces) during the compounding process. The loosened particles of nucleating agent then cause, in fact, preferential crystallisation in regions of the polymer matrix remote from the glass fibers, as in conventionally nucleated composites.

When using nucleating agents which are soluble in the molten polymer concerned, mechanical loosening of nucleating particles takes place in association with dissolution of the nucleating agent at the surface of the glass fibers. A uniform distribution in the matrix occurs therefore, not the desired preferential crystallisation at the surface of the glass. When using nucleating particles which are too small (particle size<<thickness of size film) there is the risk of covering the surface of the nucleating particles with size. Although this guarantees retention of the particles on the glass fiber, the nucleating effect of the particle surface does not occur due to it being covered with size.

Nucleating agents whose particle size is in the same range as that of the thickness of the film of glass fiber size have proved to be especially suitable, that is in the range from 40 nm to 200 nm. With anisotropic nucleating agents (e.g. platelets or needle-shaped particles) the particle size is understood to be the thickness or the diameter; the length and width may be up to a few μm (microns) in the case of nucleating agents with these shapes.

To prepare sized glass fibers according to the invention, either the known types of glass, such as E-, A-, C- and S-glass, or the known staple fiber glass products are suitable. Among the types of glass mentioned for the production of continuous glass fibers, E-glass fibers are the preferred ones for reinforcing plastics due to the lack of alkalinity, high tensile strength and high modulus of elasticity.

To prepare sized glass fibers, these are sized, using known methods, with the size according to the invention consisting of a) 2 to 20 wt. %, preferably 4 to 10 wt. %, of water-dispersible, water-emulsifiable or water-soluble polyepoxides, polyesters, polyvinyl acetates, polyacrylates and/or poly-urethanes, b) 0.1 to 10 wt. %, preferably 0.3 to 2 wt. %, of organofunctional alkoxysilanes, c) 0.1 to 20 wt. %, preferably 0.5 to 5 wt. %, of inorganic or organic nucleating agents being compounds which are chemically inert and thermally stable at the processing temperatures used at the introduction of the sized glass fibers into the polymer melt, having average particle sizes <300 nm and >10 nm and being practically insoluble in polymer melts, for examples in polyamides, polypropylenes, and polybutylene terephthalates, d) 0 to 5 wt. %, preferably 0 to 1 wt. %, of other conventional auxiliary substances such as, for example, lubricants, anti-static agents, wetting agents, emulsifiers, etc., e) 0 to 5 wt. % of additives for adjusting the pH to between 4 and 10 (this being the optimum for the particular size), (e.g. organic or inorganic acids or bases) and f) the remainder being water up to 100 wt. %, and then dried.

Further components such as, for example, emulsifiers, further film-forming resins, further adhesion promoters, lubricants and auxiliary substances such as wetting agents or anti-static agents, may be contained in the sizes. The further adhesion promoters, lubricants and other auxiliary substances, methods for preparing sizes and methods for sizing and post-processing glass fibers are known and are described, for example, in K. L. Loewenstein, "The Manufacturing Technology of Continuous Glass Fibres", Elsevier Scientific Publishing Corp., Amsterdam, London, N.Y., 1983. The glass fibers may be sized by any conventional method for example with the aid of suitable devices such as, for example, spray or roller applicators. Sizes may be applied to glass filaments drawn out from spinning nozzles at high speed immediately after they have solidified, i.e. before they have been wound onto reels. It is also possible, however, to size the fibers in an immersion bath after completion of the spinning process.

Suitable polyepoxide film formers are epoxide resins which are dispersed, emulsified or dissolved in water. These are preferably modified epoxide resins such as epoxide resins modified by amines, acid groups or hydrophilic nonionic groups based on the di-glycidyl ethers of dihydric phenols such as pyrocatechol, resorcinol, hydroquinone, 4,4'-dihydroxydiphenyldimethylmethane (bisphenol A), 4,4'-dihydroxy-3,3'-dime-thyl-diphenylpropane, 4,4'-dihydroxydiphenylsulfone, glycidyl ethers of dibasic, aromatic, aliphatic and cycloaliphatic carboxylic acids such as, for example, phthalic anhydride bisglycidyl ether or adipic acid bisglycidyl ether, glycidyl ethers of dihydric aliphatic alcohols such as butandediol bisglycidyl ether, hexanediol bisglycidyl ether or polyoxyalkyleneglycol bisglycidyl ethers and polyglycidyl ethers of polyhydric phenols, for example of Novolaks (reaction products of mono or polyhydric phenols with aldehydes, in particular formaldehyde, in the presence of acid catalysts), tris-(4-hydroxyphenyl)methane or 1,1,2,2-tetra-(4-hydroxyphenyl)-ethane, epoxide compounds based on aromatic amines and epichlorohydrin, for example on glycerol, trimethylolpropane, pentaerythritol and further glycidyl compounds such as trisglycidyl isocyanurate. Suitable chemical modifications are, for example, the addition of amines or the addition of hydrophilic polyethers, e.g. polyethylene glycol. Suitable polyepoxide dispersions are described, for example, in EP-A 27 942, EP-A 311 894, U.S. Pat. Nos. 3,249,412, 3,449,281, 3,997,306 and 4,487,797 incorporated by reference herein. Polyesterepoxides based on bisphenol A and Novolaks which are dispersed, emulsified or dissolved in water are preferred.

Polyurethane film formers are reaction products of preferably difunctional poly-isocyanates with preferably dihydric polyols and optionally preferably difunctional polyamines which are dispersed, emulsified or dissolved in water. The synthesis of polyurethane dispersions, the building blocks which can be used, methods of preparation and the properties thereof are known to a person skilled in the art and are described, for example, in Houben-Weyl, "Methoden der Organische Chemie", vol. E20, edited by H. Bartl and J. Falbe, Georg Thieme Verlag Stuttgart, N.Y., 1987, on pages 1587 to 1604, 1659 to 1681 and 1686 to 1689 incorporated herein by reference.

Suitable isocyanates for polyurethane film formers are aliphatic, cycloaliphatic, araliphatic, aromatic and heterocyclic polyisocyanates or their mixtures. Included are 1,6-hexamethylene diisocyanate, 1-isocyanato-3,3,5-trimethyl-5-isocyanatomethyl-cyclohexane, 2,4- and 2,6-toluylene diiso-cyanate, diphenylmethane-2,4'or 4,4'-diisocyanate.

Suitable polyols for preparing polyurethane film formers are polyesters and polyethers including the reaction products of preferably dihydric polyalcohols such as e.g. ethylene glycol, propylene glycol, butylene glycol and hexanediol with preferably dibasic poly-carboxylic acids or their esterifiable derivatives such as, for example, succinic acid, adipic acid, phthalic acid, phthalic anhydride, maleic acid and maleic anhydride. Polyesters derived from lactones, e.g. ε-caprolactam, can also be used. Suitable polyethers include those prepared, for example, by polymerisation of epoxides such as, for example, ethylene oxide, propylene oxide or tetrahydrofuran with themselves or by addition of the epoxides to starter compounds with reactive hydrogen atoms such as water, alcohols, ammonia or amines.

So-called chain extenders for polyurethane film formers, include preferably dihydric polyols or difunctional polyamines with a molecular weight of less than 400. Particularly preferred are dihydric polyalcohols such as ethylene glycol, propylene glycol, butylene glycol, aminoalcohols such as ethanolamine, N-methyl-diethanolamine and difunctional polyamines such as e.g. ethylene diamine, 1,4-tetramethylene diamine, hexamethylene diamine, 1-amino-3,3,5-trimethyl-5-aminomethyl-cyclo-hexane, bis-(3-aminopropyl)-methylamine and hydrazine.

Polyurethane dispersions, emulsions or solutions which contain epoxide groups or capped isocyanate groups (see for instance the relevant disclosure in EP-A 137 427) are also suitable.

Polyester dispersions are preferably reaction products of the previously mentioned polyepoxides with the previously mentioned polycarboxylic acids or carboxyl group-containing polyesters (see for instance the relevant disclosure in EP-A 27 942) which no longer contain any epoxide groups.

Suitable organofunctional alkoxysilanes (b) are, for example, 3-amino-propyl-trimethoxysilane, 3-aminopropyltriethoxysilane, 3-aminopropyltrismethoxyethoxy-silane, 3-aminopropyl-methyldiethoxysilane, N-2-aminoethyl-3-aminopropyltrimeth-oxysilane, N-2-aminoethyl-3-aminopropylmethyldimethoxysilane and N-methyl-3-amino-propyl-trimethoxysilane, 3-glycidyloxypropyltrimethoxysilane, 3-methacryloxy-propyl-trimethoxysilane, 3-mercaptopropyltrimethoxysilane, vinyltriethoxy-silane or vinyltrimethoxysilane, oligoazamidosilanes, e.g. from WITCO company.

Suitable nucleating agents (c) are, for example, talcum, barium sulfate, titanium dioxide, lithium salts, calcium phenylphosphinate, sodium phenylphosphinate, calcium fluoride, salts of organic acids (derivatives of benzoic acid and phthalic acid), sorbitol, sorbitol derivatives, tannin, tannin derivatives, etc.

In addition, further size components (d) such as anionic, cationic or non-ionic emulsifiers, further film-forming resins, lubricants such as, for example, polyethylene glycol ethers of fatty alcohols or fatty amines, polyalkylene glycol esters and glycerol esters of fatty acids with 12 to 18 carbon atoms, polyalkylene glycols of higher fatty acid amides with 12 to 18 carbon atoms of polyalkylene glycols and/or alkenyl-amines, quaternary nitrogen compounds, e.g. ethoxylated imidazolinium salts, mineral oils or waxes and auxiliary substances such as wetting agents or anti-static agents such as, for example, lithium chloride or ammonium chloride, may be contained in the sizes. These further auxiliary substances are known to a person skilled in the art and are described, for example, in K. L. Loewenstein, "The Manufacturing Technology of Continuous Glass Fibres", Elsevier Scientific Publishing Corp., Amsterdam, N.Y., 1983 incorporated by reference herein.

Glass fibers according to the invention are suitable as reinforcing fibers for thermo-plastic polymers such as, for example, polycarbonate, polyamide-6 and polyamide-6,6, aromatic polyesters such as, for example, polyethylene terephthalate and polybutylene terephthalate, polypropylene, polyurethanes or polyarylene sulfides and thermoset polymers such as unsaturated polyester resins, epoxide resins and phenol/-formaldehyde resins.

Glass fibers according to the invention are preferably used as reinforcing fibers for polyamides, aromatic polyesters and polypropylene.

The present invention is now explained in more detail by means of the following specific examples.

EXAMPLES

Example 1 and Comparison Example 1
(Preparation of Sized Glass Fibers According to the Invention)

The sizes (composition, see table 1) were applied, with stirring, to non-sized, milled glass fibres (Milled Fibres: obtainable e.g. as commercial product MF 7980 from Bayer AG, Leverkusen). The glass fibres sized in this way were then dried for 10 hours at 130° C. The organofunctional alkoxysilane was an amino silane which is available from Witco as Silane A1100. The film former was BAYBOND® polyurethane PU 401 from Bayer AG.

TABLE 1

| Size components | Example 1 [wt. %] | Comparison 1 [wt. %] |
|---|---|---|
| Water | 86.1 | 86.7 |
| Acetic acid (80% by weight) | 0.3 | 0.3 |
| Organofunctional alkoxysilane | 1.0 | 1.0 |
| Film former | 12.0 | 12.0 |
| Talcum ($d_{50}$:57 nm) | 0.6 | — |

Preparation of the talcum used in the size (particle size: $d_{50}$:57 nm)

While the procedure used in preparing the talc is not critical, the following was found to be suitable:

50 g of polyvinylpyrrolidone K17 (LUVISKOL K17) and 50 g of sodium octyl sulphate are dissolved in 1900 ml of deionized water with intense mixing using a laboratory stirrer. 500 g of talcum A3 (from the company Naintsch Mineralwerke GmbH, Graz) are added to this solution, which is then homogenized with an intensive stirring system (ULTRA-TURRAX).

This suspension is wet-ground in an agitator ball mill ("DRAIS-PML-V/H" from the company Draiswerke GmbH, Mannheim) over a period of 210 minutes using milling balls made of zirconium dioxide and having a size of 0.3 to 0.4 mm (a degree of filling with the grinding media of 70% and a stirrer rotational speed of 3,000 r.p.m.).

The characterization of the particles was carried out by means of an ultracentrifuge (mass distribution). The following values were determined for the mass distribution:

| | $d_{50}$ |
|---|---|
| homogenized suspension, particle sizes prior to wet grinding | 0.99 µm |
| particle sizes after wet grinding (210 minutes) | 57 nm |

In the above table (with regard to particle sizes of the homogenized suspension prior to wet grinding) $d_{50}$ means that 50% of all of the particles are not larger than 0.99 µm. In this connection particles refer both to primary particles and to aggregates and agglomerates.

Also in the above table (with regard to particle sizes following wet grinding) $d_{50}$ means that 50% of all of the particles are not larger than 57 nm. In this connection particles refer both to primary particles and to aggregates and agglomerates.

Example 2
(Use of Sized Glass Fibers)

70 parts by weight of polyamide 6 (DURATHAN® B29, commercial product from Bayer AG, Leverkusen) and 30 parts by weight of sized glass fibres from example 1 or comparison example 1 are extruded in a twin-shaft extruder (ZSK 32 from Werner & Pfleiderer) at an extruder temperature of 260° C. to produce moulding compositions and then granulated. 80×10×4 mm test bars and tensile bars are prepared from the moulding compositions in a conventional injection moulding Mo5339 machine. The flexural strength according to ISO 178, the tensile strength according to ISO 527 and the IZOD impact resistance at room temperature (according to ISO 180 1C) are tested.

TABLE 2

|  | Flexural modulus [MPa] | Flexural strength [MPa] | Tensile strength [MPa] | Impact resistance [kJ/m$^2$] |
|---|---|---|---|---|
| glass fibres from example 1 (size containing talcum) | 6470 | 174 | 99 | 24.4 |
| glass fibres from comparison example 1 (size without talcum) | 6020 | 165 | 94 | 22.9 |

Example 3
(Heated Table Polarisation Microscopic Investigation of Molding Compositions which Contain Sized Glass Fibers)

Thin layers of polyamide 6 compounds which contained the corresponding sized glass fibers, following compounding, are melted, annealed and cooled again between crossed polarisers, using the following temperature programme, on the heated table of a polarisation microscope:

| Room temperature | ---> | 60° C./min | --> | 250° C., held for 6 min |
|---|---|---|---|---|
|  |  | 40° C./min | --> | 205° C., held for 5 min |
|  |  | 60° C./min | --> | 250° C., held for 6 min |
|  |  | 40° C./min | --> | 205° C., held for 5 min |
|  |  | 60° C./min | --> | 250° C., held for 6 min |
|  |  | 40° C./min | --> | 205° C., measurement/ observation |

The appearance of the samples is documented photographically (see figures) after specific cooling times under identical cooling conditions. The samples which contain talcum clearly show transcrystallisation starting from the glass fiber, i.e. nucleation is much more intense at the surface of the glass than in the polymer matrix.

What is claimed is:

1. A glass fiber reinforced composite comprising polymeric matrix and glass fibers, said glass fibers sized with a composition consisting of
    a) 2 to 20 percent of a water dispersible, water soluble or water emulsifiable resin selected from the group consisting of polyepoxide, polyester, polyvinyl acetate, polyacrylate and polyurethane,
    b) 0.1 to 10 percent organofunctional alkoxysilane,
    c) 0.1 to 20 percent of an inorganic or organic nucleating agent being a compound which is chemically inert and thermally stable at the processing temperatures used at the introduction of the sized glass fibers into the polymer melt, having a particle size ($d_{50}$), of about 10 to 300 nanometers, said nucleating agent being practically insoluble in polymer melts,
    d) 0 to 5 percent of at least one member selected from the group consisting of emulsifier, lubricant, wetting agent and anti-static agent,
    e) 0 to 5 percent of a functional additive in an amount sufficient to render the composition pH of 4 to 10, and
    f) a quantity of water,
said percent, all occurrences, being relative to the total weight of a), b), c), d), e) and f), said total amounting to 100, wherein nucleating agent is a number selected from the group consisting of talcum, barium sulfate, titanium dioxide, lithium salt, calcium phenylphosphinate, sodium phenylphosphinate, calcium fluoride, salt of organic acid, sorbitol, sorbitol derivative, tannin and tannin derivative.

2. The composition of claim 1 wherein said c) is talc.

3. The composite of claim 1 wherein matrix is at least one thermoplastic resin selected from the group consisting of polyamide, polyester, polycarbonate, polyurethane, polyarylene sulfide and polypropylene.

4. The composite of claim 1 wherein matrix is at least one thermsetting resin selected from the group consisting of unsaturated polyester, epoxide and phenol formaldehyde.

* * * * *